United States Patent
Ayapbergenov et al.

(10) Patent No.: US 9,725,973 B2
(45) Date of Patent: Aug. 8, 2017

(54) METHODS AND PROCESSES TO RECYCLE BASE OIL FLUIDS FROM SPENT INVERT EMULSION DRILLING FLUIDS

(71) Applicant: Halliburton Energy Services, Inc., Houston, TX (US)

(72) Inventors: Yerzhan Ayapbergenov, Houston, TX (US); Timothy N. Harvey, Humble, TX (US); Gregory Douglas Abbott, II, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 90 days.

(21) Appl. No.: 14/685,968

(22) Filed: Apr. 14, 2015

(65) Prior Publication Data

US 2015/0345273 A1    Dec. 3, 2015

Related U.S. Application Data

(63) Continuation of application No. 14/435,535, filed as application No. PCT/US2014/039497 on May 27, 2014.

(51) Int. Cl.

| | |
|---|---|
| *C10G 31/06* | (2006.01) |
| *C10G 33/00* | (2006.01) |
| *C10G 33/06* | (2006.01) |
| *E21B 43/34* | (2006.01) |
| *E21B 21/06* | (2006.01) |
| *B01D 3/02* | (2006.01) |
| *B01D 45/16* | (2006.01) |
| *C10G 7/00* | (2006.01) |
| *C10G 31/10* | (2006.01) |
| *B01D 3/00* | (2006.01) |
| *B01D 3/08* | (2006.01) |
| *B01D 17/04* | (2006.01) |
| *C02F 1/04* | (2006.01) |
| *C02F 103/10* | (2006.01) |

(52) U.S. Cl.
CPC ............ *E21B 21/065* (2013.01); *B01D 3/007* (2013.01); *B01D 3/02* (2013.01); *B01D 3/08* (2013.01); *B01D 17/042* (2013.01); *B01D 45/16* (2013.01); *C02F 1/04* (2013.01); *C10G 7/006* (2013.01); *C10G 31/06* (2013.01); *C10G 31/10* (2013.01); *E21B 21/062* (2013.01); *E21B 21/063* (2013.01); *E21B 43/34* (2013.01); *C02F 2103/10* (2013.01); *C10G 2300/1007* (2013.01); *C10G 2300/1033* (2013.01); *C10G 2300/1051* (2013.01); *C10G 2300/1055* (2013.01); *C10G 2300/1081* (2013.01); *C10G 2300/1088* (2013.01); *C10G 2300/1096* (2013.01); *C10G 2300/208* (2013.01)

(58) Field of Classification Search
CPC ........ C10G 31/06; C10G 33/00; C10G 33/06; C10G 2300/1033; E21B 43/34
See application file for complete search history.

(56) References Cited

U.S. PATENT DOCUMENTS

| | | | | |
|---|---|---|---|---|
| 4,222,988 | A * | 9/1980 | Barthel ................. | E21B 21/066 175/66 |
| 4,869,810 | A * | 9/1989 | Ellingsen ................. | B01D 3/08 159/6.2 |
| 5,294,061 | A * | 3/1994 | van Dijk .................. | C10G 1/02 208/407 |
| 2005/0236015 | A1 * | 10/2005 | Goel ..................... | E21B 41/005 134/10 |
| 2015/0345273 | A1 * | 12/2015 | Ayapbergenov ........ | E21B 43/34 203/22 |

FOREIGN PATENT DOCUMENTS

| | | | | |
|---|---|---|---|---|
| NO | WO 02092187 | A1 * | 11/2002 | ............... B01D 3/08 |
| WO | 2015183233 | A1 | 12/2015 | |

OTHER PUBLICATIONS

A. Alba et al., Environmentally Safe Waste Disposal: The Integration of Cuttings Collection, Transport, and Reinjection, SPE 108912 (2007).*
A. J. Murray et al., Friction-Based Thermal Desorption Technology: Kashagan Development Project Meets Environmental Compliance in Drill-Cuttings Treatment and Disposal, SPE 116169 (2008).*
S. Kleppe, Reusing Recovered Base Oil from OBM Cuttings, SPE 123559 (2009).*
J. Ormeloh, "Thermomechanical Cuttings Cleaner—Qualification for Offshore Treatment of Oil Contaminated Cuttings on the Norwegian Continental Shelf and Martin Linge Case Study" (Master's thesis, University of Stavanger (Norway), 2014.*
T. Bilstad et al., Environmental Friendly Drilling Fluid Management Offshore Norway, 31 AGH Drilling, Oil, Gas 191-197 (2014).*

* cited by examiner

*Primary Examiner* — Randy Boyer
(74) *Attorney, Agent, or Firm* — McDermott Will & Emery LLP

(57) ABSTRACT

Methods and processes for recycling base oils from spent invert emulsion drilling fluids may include frictionally heating a spent drilling fluid that comprises an invert emulsion and solids, wherein the solids are at about 50% or less by volume of the spent drilling fluid; and simultaneously evaporating oil and water from the invert emulsion at a temperature lower than an atmospheric boiling point for the oil.

10 Claims, 1 Drawing Sheet

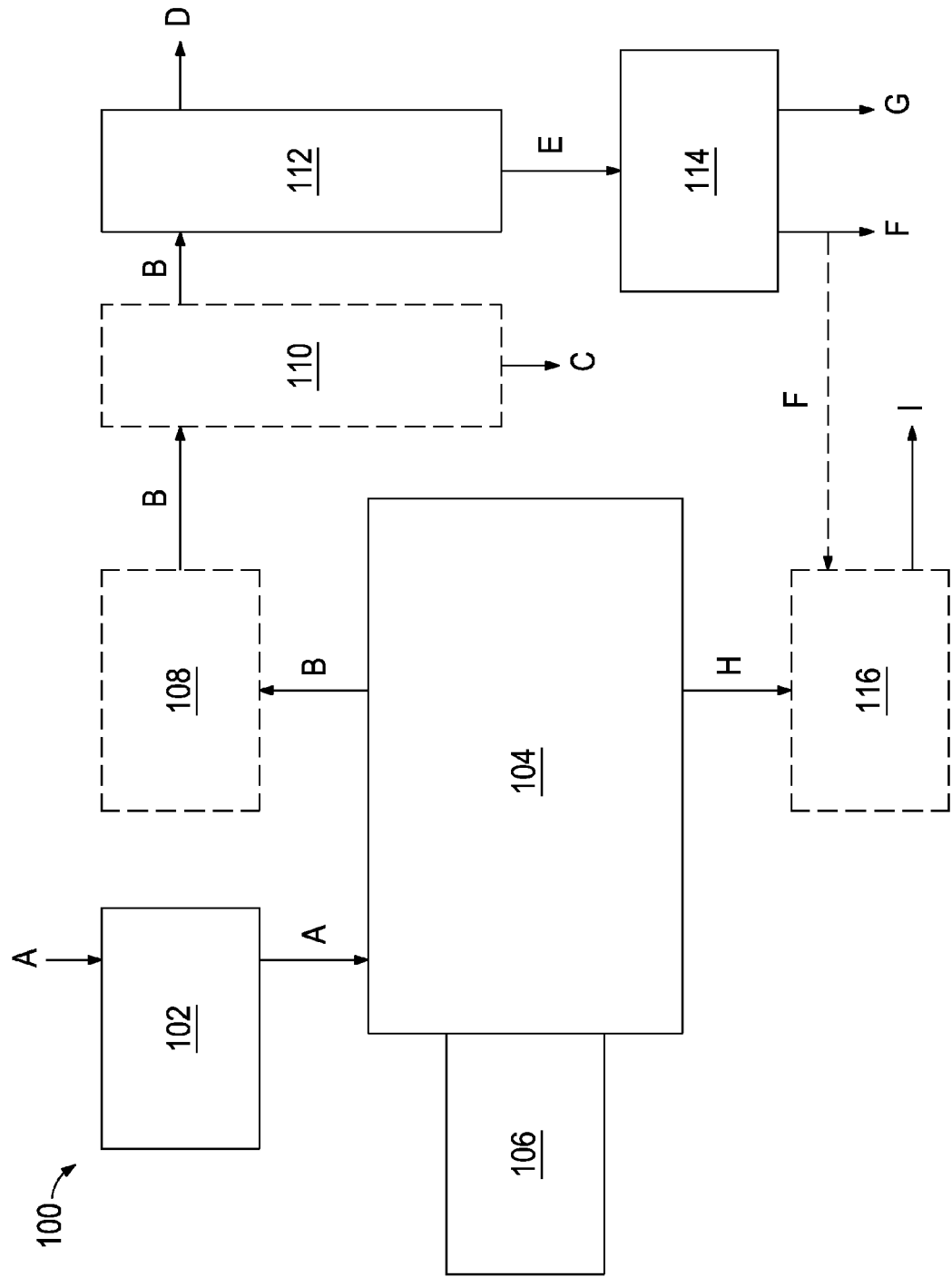

METHODS AND PROCESSES TO RECYCLE BASE OIL FLUIDS FROM SPENT INVERT EMULSION DRILLING FLUIDS

BACKGROUND

The embodiments described herein relate to methods and processes for recycling base oils from spent invert emulsion drilling fluids.

Drilling fluids are circulated through a wellbore during a drilling operation, for example, to remove cuttings (i.e., small pieces of the formation that break away during drilling) and to cool the drill bit. In some instances, drilling fluids are an oil-based fluid that includes a weighting agent. Typically, weighting agents include particles of high-density minerals that increase the density of the drilling fluid. Increasing the density of the drilling fluid may help to stabilize the wellbore and mitigate formation fluid intrusion into the wellbore.

As drilling fluids are circulated through the wellbore during the drilling process, the drilling fluids collect drilled solids or "cuttings." These cuttings affect the properties of the drilling fluid. Accordingly, drilling fluids may be passed through a series of processes or apparatuses to remove the cuttings (e.g., vibrating screens for filtration). However, as the drilling continues, the cuttings are further broken down into smaller and smaller particles that cannot be effectively removed by normal mechanical means. Further, the density of cuttings is often sufficiently low that gravity or centrifugal methods to remove the cuttings is inefficient or ineffective. Once the properties of the drilling fluid are deemed unfit for drilling, the drilling fluid is considered to be a "spent" drilling fluid that is now waste.

Disposing of spent drilling fluid may involve burning the contents in a cement kiln. Some have attempted to recover the oil from the drilling fluid. For example, the spent drilling fluid may be heated in a high temperature calciner to vaporize the fluid that can then be condensed and recovered. However, high temperature processes can be energy intensive and, in some instances, may crack or degrade the oil, which reduces the ability to reuse the oil in a new drilling fluid.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 provides an illustration of an exemplary system according to at least some embodiments described herein.

DETAILED DESCRIPTION

The embodiments described herein relate to methods and processes for recycling base oils from spent invert emulsion drilling fluids.

The embodiments described herein use thermal desorption of spent, solids-laden, invert emulsion drilling fluids to evaporate the fluid from the spent drilling fluid. Generally, the systems and methods described herein use a thermal desorption process (e.g., via a hammer mill technology) to create friction between solids in a spent drilling fluid to heat the fluid (water and base oils). In some instances, the presence of both the water and base oils may allow for the processing temperature to be less than the atmospheric boiling point of the oil (i.e., the boiling point of the oil at atmospheric pressure). This, in addition to limiting the amount of oxygen in the systems may, in some instances, provide for mitigation of oil cracking and degradation issues. By contrast, traditional heating, where the water may evaporate before the base oil, may require higher temperatures that may lead to degradation of the base oil, thereby reducing the value of the base oil.

In some instances, frictional heating of high solids content compositions (e.g., greater than about 50% by volume solids), sometimes referred to as sludge, has been used to remove thin coatings of oil and water on solids. However, conventional wisdom has been that a high concentration of solids is required to provide enough particle-particle interaction to produce thermo-mechanical heating. The ability to effectively evaporate the fluid from the spent drilling fluid by thermo-mechanical heating when the spent drilling fluid has less than 50% by volume solids, and especially instances of less than about 25% by volume solids, is counter to the accepted wisdom.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques. Further, it should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

Some embodiments may involve thermo-mechanically heating a spent drilling fluid that comprises an invert emulsion (i.e., water-in-oil emulsion) and low gravity solids; and simultaneously evaporating oil and water of the invert emulsion at a temperature lower than an atmospheric boiling point for the oil.

Some embodiments may optionally further involve separating the oil and water evaporated from the spent drilling fluid and optionally collecting the oil, the water, or both (sometimes referred to as recovered oil or recovered water). In some instances, the recovered oil may advantageously be used to produce a new drilling fluid.

Some embodiments may further involve collecting and/or disposing of the low gravity solids retained after evaporating oil and water. In some instances, if the low gravity solids have a fine size, they may easily become airborne. In some instances, recovered water or other fluid may be used to hydrate the low gravity solids to mitigate dispersion of the particles in the air.

In some instances, the methods described herein may be performed continuously or intermittently (e.g., during daylight hours only).

In some embodiments, a spent drilling fluid suitable for processing by the systems and methods described herein may have about 75 vol % solids or less (e.g., including low gravity solids or otherwise). In some embodiments, the spent drilling fluid may have a solids content ranging from a lower limit of about 1 vol %, 5 vol %, 10 vol %, 15 vol %, or 25 vol % to an upper limit of about 50 vol %, 40 vol %, or 30 vol %, wherein the solids content may range from any lower limit to any upper limit and encompass any subset therebetween.

In some embodiments, an oil continuous phase of an invert emulsion may include, but is not limited to, an alkane, an olefin, an aromatic organic compound, a cyclic alkane, a paraffin, a diesel fluid, a mineral oil, a desulfurized hydrogenated kerosene, and the like, and any combination thereof.

In some embodiments, a water discontinuous phase of an invert emulsion may include, but is not limited to, fresh water, saltwater (e.g., water containing one or more salts dissolved therein like sodium chloride, calcium chloride, and calcium nitrate), brine (e.g., saturated or near saturated salt water), seawater, and the like, and any combination thereof.

In some embodiments, an invert emulsions may have an oil-to-water ratio from a lower limit of greater than about 50:50, 55:45, 60:40, 65:35, 70:30, 75:25, or 80:20 by volume in the invert emulsion to an upper limit of less than about 100:0, 95:5, 90:10, 85:15, 80:20, 75:25, 70:30, or 65:35 by volume in the invert emulsion, where the oil-to-water ratio may range from any lower limit to any upper limit and encompass any subset there between.

FIG. 1 provides an illustration of an exemplary system 100 according to at least some embodiments described herein. The system 100 may include a feeder 102 to which the spent drilling fluid A is loaded and mixed (e.g., homogenized). The feeder 102 feeds the spent drilling fluid A at an appropriate rate into a friction dryer 104. The friction dryer 104 may include a rotor(s) (not shown) that is driven by a drive unit 106. The friction dryer 104 may produce evaporated fluid B (e.g., a mixture of water and oil). An example of a friction dryer 104 may include a Thermomechanical Cuttings Cleaner® (TCC) (a thermo-mechanical cuttings cleaner, available from Thermtech).

The evaporated fluid B may optionally then pass through a scrubber 108 (e.g., to remove any fine, low gravity solids carried by the evaporated fluid B). Examples of scrubbers may include, but are not limited to, filters, hydrocyclones, and other separation devices. In some instances (not shown), the solids collected by the scrubber 108 may be collected and stored.

The evaporated fluid B may then optionally pass to an oil condenser 110 to recover heavy oil C, if present. The evaporated fluid B (less heavy oil C if removed) may then pass to a steam condenser 112 that separates non-condensable gas D (e.g., nitrogen) from a mixture of water and light oil E. The mixture of water and light oil E may then be processed in an oil/water separator 114 to produce recovered water F and recovered light oil G. The solids H from the spent drilling fluid may be collected from the friction dryer 104. In some instances, the solids H may be stored or discarded as is. In some instances (e.g., with fine solids that easily become airborne), water (e.g., recovered water F) or another fluid may be used to hydrate the solids H in a rehydration unit 116 to produce hydrated solids I. In some instances (not shown), the solids collected by the scrubber 108 may be combined with the solids H. In some instances (not shown), the solids collected by the scrubber 108 may be treated in a similarly, but independently, of the solids H.

In some instances, a system may include a control program and sensors for monitoring and executing various steps of the methods described herein. For example, a friction dryer may include sensors for monitoring temperature, which may be used to guide the feed rate of spent drilling fluid into the friction dry, the rotational speed of the rotors in the friction dryer, and the rate at which low gravity solids are removed from the friction dryer.

In some instances, a system, or portion thereof, may be deployed on a truck, a barge (or other water-faring vessel), or the like and travel between well sites or drilling platforms to collect and process spent drilling fluid. Such embodiments may advantageously reduce the space for storage of spent drilling fluid, which may be especially advantageous for off-shore drilling platforms where space is a precious commodity.

Embodiments disclosed herein include Embodiment A, Embodiment B, and Embodiment C.

Embodiment A: A method that includes frictionally heating a spent drilling fluid that comprises an invert emulsion and solids, wherein the solids are at about 50% or less by volume of the spent drilling fluid; and simultaneously evaporating oil and water from the invert emulsion at a temperature lower than an atmospheric boiling point for the oil.

Embodiment B: A method that includes frictionally heating a spent drilling fluid that comprises an invert emulsion and solids, wherein the solids are at about 50% or less by volume of the spent drilling fluid; simultaneously evaporating oil and water of the invert emulsion at a temperature lower than an atmospheric boiling point for the oil; then, scrubbing the oil and the water having been evaporated from the spent drilling fluid; and then, separating the oil and the water.

Embodiments A and B may independently have one or more of the following additional elements in any combination: Element 1: the method further including collecting the oil; Element 2: the method further including collecting the oil and producing a drilling fluid comprising the oil; Element 3: the method further including collecting the water; Element 4: the method further including collecting the solids; collecting the water; and mixing at least a portion of the water with at least a portion of the solids; Element 5: wherein the solids are at about 30% or less by volume of the spent drilling fluid; and Element 6: wherein the solids are at about 10% or less by volume of the spent drilling fluid.

By way of non-limiting example, exemplary combinations applicable to Embodiments A or B include: combinations of Elements 1 and 3 optionally in further combination with one of Elements 5 or 6; combinations of Elements 2 and 3 optionally in further combination with one of Elements 5 or 6; combinations of Elements 1, 3, and 4 optionally in further combination with one of Elements 5 or 6; combinations of Elements 2, 3, and 4 optionally in further combination with one of Elements 5 or 6; etc.

Embodiment C: A method that includes frictionally heating a spent drilling fluid that comprises an invert emulsion and solids, wherein the solids are at about 50% or less by volume of the spent drilling fluid; simultaneously evaporating oil and water of the invert emulsion at a temperature lower than an atmospheric boiling point for the oil; separating the oil and the water; collecting the solids; and mixing at least a portion of the water with at least a portion of the solids.

Embodiment C may have one or more of the following additional elements in any combination: Element 7: the method further including collecting the oil; Element 8: the method further including collecting the oil and producing a drilling fluid comprising the oil; Element 9: the method further including collecting the water; Element 10: wherein the solids are at about 30% or less by volume of the spent drilling fluid; and Element 11: wherein the solids are at about 10% or less by volume of the spent drilling fluid.

hydrocyclone), an oil condenser, a steam condenser, and an oil/water separator. A series of spent (solids-laden) drilling fluids were processed with the system and performance of the system was analyze, see Table 1.

TABLE 1

|  | DF 1 | DF 2 | DF 3 | DF 4 | DF 5 |
|---|---|---|---|---|---|
| Average Properties | | | | | |
| weight (ppg) | 9.6 | 11.2 | 13.6 | 15.2 | 20.2 |
| oil (vol %) | 74.0 | 66.3 | 61.7 | 55.1 | 39.5 |
| water (vol %) | 12.0 | 14.5 | 12.3 | 11.9 | 9.3 |
| solids (vol %) | 14.0 | 19.3 | 26.0 | 33.0 | 51.3 |
| Average Particle Size Distribution of Solids | | | | | |
| d10 (microns) | 1.6 | 1.9 | 1.8 | 2.3 | 4.5 |
| d50 (microns) | 3.8 | 5.9 | 8.3 | 22.4 | 24.6 |
| d90 (microns) | 11.2 | 41.6 | 60.6 | 67.9 | 63.2 |
| Performance Analysis | | | | | |
| average process rate (MT/hr)* | 2.9 | 3.0 | 4.2 | 6.2 | 7.9 |
| mass processed per day (MT) | 69.6 | 71.7 | 101.8 | 148.3 | 189.0 |
| volume DF processed per day (barrels) | 380.6 | 336.1 | 392.8 | 512.2 | 491.2 |
| value of recovered oil per day (US$)** | 45,066 | 35,626 | 38,759 | 45,188 | 31,045 |

*MT = metric tons
**value based on oil cost of $160 per barrel

By way of non-limiting example, exemplary combinations applicable to Embodiments A or B include: combinations of Elements 7 and 9 optionally in further combination with one of Elements 5 or 6; combinations of Elements 8 and 9 optionally in further combination with one of Elements 5 or 6; etc.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions, systems, and methods are described herein in terms of "comprising" various components or steps, the compositions, systems, and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

A system similar to that of FIG. 1 was configured with a feeder (a feed hopper with hydraulic feed pump), a TCC® process mill with a 1.3 MW diesel engine, a scrubber (a This example demonstrates that the systems and methods described herein can process spent drilling fluids with low concentrations of solid. Additionally, in this instance, an alternative to processing the spent drilling fluids was disposal via incinerations, which, at the time, cost about $130/MT plus transportation. Therefore, this example also illustrates the economic value of the methods and systems described herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
frictionally heating a spent drilling fluid that comprises an invert emulsion and solids, wherein the solids are at about 50% or less by volume of the spent drilling fluid; and
simultaneously evaporating oil and water from the invert emulsion at a temperature lower than an atmospheric boiling point for the oil.

2. The method of claim 1 further comprising: collecting the oil.

3. The method of claim 1 further comprising: collecting the water.

4. The method of claim 1, wherein the solids are at about 30% or less by volume of the spent drilling fluid.

5. The method of claim 1, wherein the solids are at about 10% or less by volume of the spent drilling fluid.

6. The method of claim 1, wherein simultaneously evaporating oil and water produces an evaporated fluid and the solids in separate streams, and the method further comprising:
separating the water and the oil in the evaporated fluid; and
mixing at least a portion of the water from the evaporated fluid with at least a portion of the solids.

7. The method of claim 1, wherein simultaneously evaporating oil and water produces an evaporated fluid and the solids in separate streams, and the method further comprising:
passing the evaporated fluid through a scrubber.

8. A method comprising:
frictionally heating, in a frictional heater, a spent drilling fluid that comprises an invert emulsion and solids, wherein the solids are at about 50% or less by volume of the spent drilling fluid, thereby simultaneously evaporating oil and water from the invert emulsion at a temperature lower than an atmospheric boiling point for the oil, to produce an evaporated fluid and solids in separate streams;
passing the evaporated fluid from the frictional heater through a scrubber to remove low gravity solids present in the evaporated fluid;
separating the oil and the water in the evaporated fluid after passing through the scrubber;
producing a drilling fluid with at least a portion of the oil.

9. The method of claim 8, wherein the solids are at about 30% or less by volume of the spent drilling fluid.

10. The method of claim 8, wherein the solids are at about 10% or less by volume of the spent drilling fluid.

* * * * *